April 5, 1927.

H. T. LINDGREN 1,623,737

BEET PULLER

Filed Feb. 13, 1922

Inventor:
Hugo T. Lindgren

April 5, 1927. 1,623,737
H. T. LINDGREN
BEET PULLER
Filed Feb. 13, 1922 3 Sheets-Sheet 2
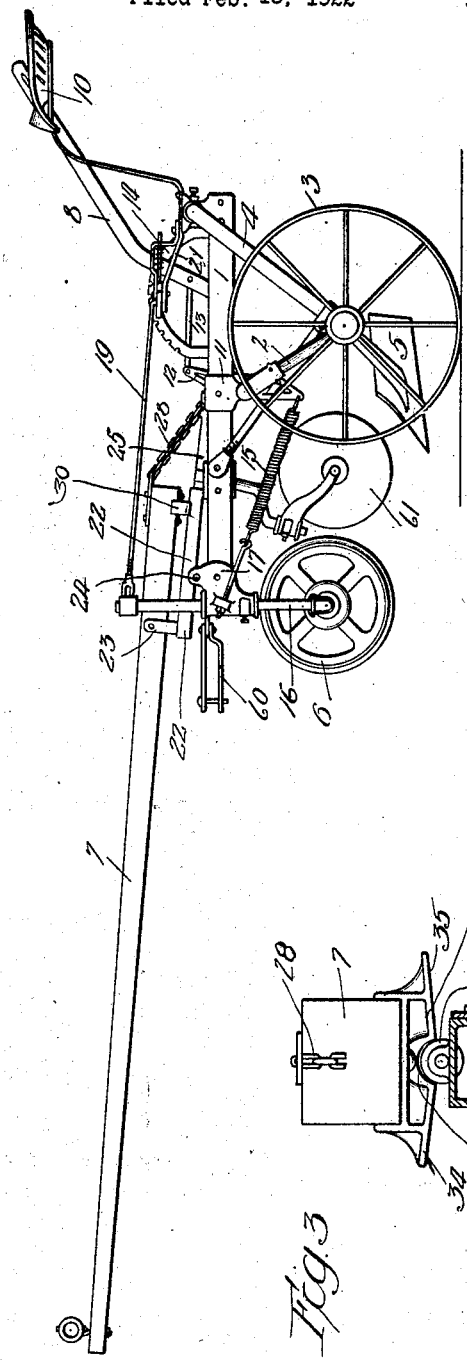
Inventor
Hugo T. Lindgren April 5, 1927.

H. T. LINDGREN

BEET PULLER 1,623,737

Filed Feb. 13, 1922

Inventor:
Hugo T. Lindgren
L. C. Shonts  Atty

Patented Apr. 5, 1927.

1,623,737

UNITED STATES PATENT OFFICE.

HUGO T. LINDGREN, OF MOLINE, ILLINOIS, ASSIGNOR, BY MESNE ASSIGNMENTS, TO MOLINE IMPLEMENT COMPANY, A CORPORATION OF ILLINOIS.

BEET PULLER.

Application filed February 13, 1922. Serial No. 536,100.

The invention relates to beet pullers.

The general object of the invention is to provide an improved beet puller.

A more specific object is to provide a beet puller in which the control of the mechanism is effected by means of a single lever.

Another object is to provide a beet puller that can be efficiently steered when being used to pull beets and when being transported.

Other objects and advantages of the invention will appear from the specification and drawings.

An embodiment of the invention is illustrated in the drawings in which,

Figure 2 is a side elevation of the beet puller in raised position.

Figure 3 is a detailed end elevation of the guiding pole.

Figure 1:
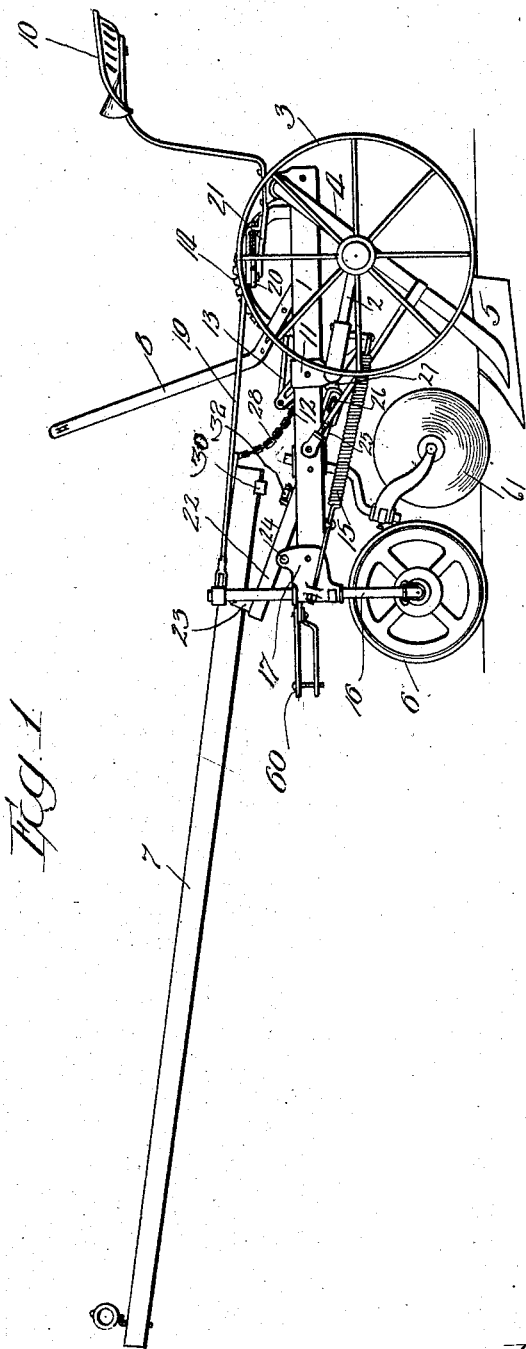
Figure 1 is a side elevation of the beet puller in its lowered position.

The machine comprises, in general, a frame 1 to which is rotatably attached a crank axle 2 carried by supporting wheels 3, a pair of arms 4 carrying beet pulling tools 5, a pair of steering wheels 6, a guiding pole 7, and a controlling lever 8.

The frame 1 may be made of any suitable material and in any required shape, preferably being made of steel and being approximately rectangular in shape. It supports an operator's seat 10 which is attached in the rear. The crank axle is connected to the frame by bearings 11, the supporting wheels 3 being journaled on the ends of the axle. Fixed to the crank axle is a crank 12 shown in Figure 2 connected by a link 13 with the controlling lever 8 which is pivoted to the frame and which cooperates with a toothed sector 14 along which it may be adjusted. Movements of the controlling lever are transmitted in this manner to the crank axle which swings relative to the frame to raise and lower the wheels, thereby effecting a lowering and raising movement of the frame relative to the ground. Springs 15 are connected between the frame and the crank axle to normally bias the axle in a clockwise direction, the purpose of this arrangement being to counteract the weight of the operator and to make it easily possible to raise the machine with one hand by means of the lever 8. It will be noted, by referring to Figures 1 and 2, that the greatest force is exerted by this spring when the machine is in lowered position as shown in Figure 1 and that, as the machine moves toward the position of Figure 2, the tension of the spring is relieved. The location of the parts is such that the machine is balanced in all positions of the controlling lever 8. In order to compensate for operators of different weight, the springs may be adjusted by means of the nuts on the ends of the links connecting the springs to the frame.

Figure 4:
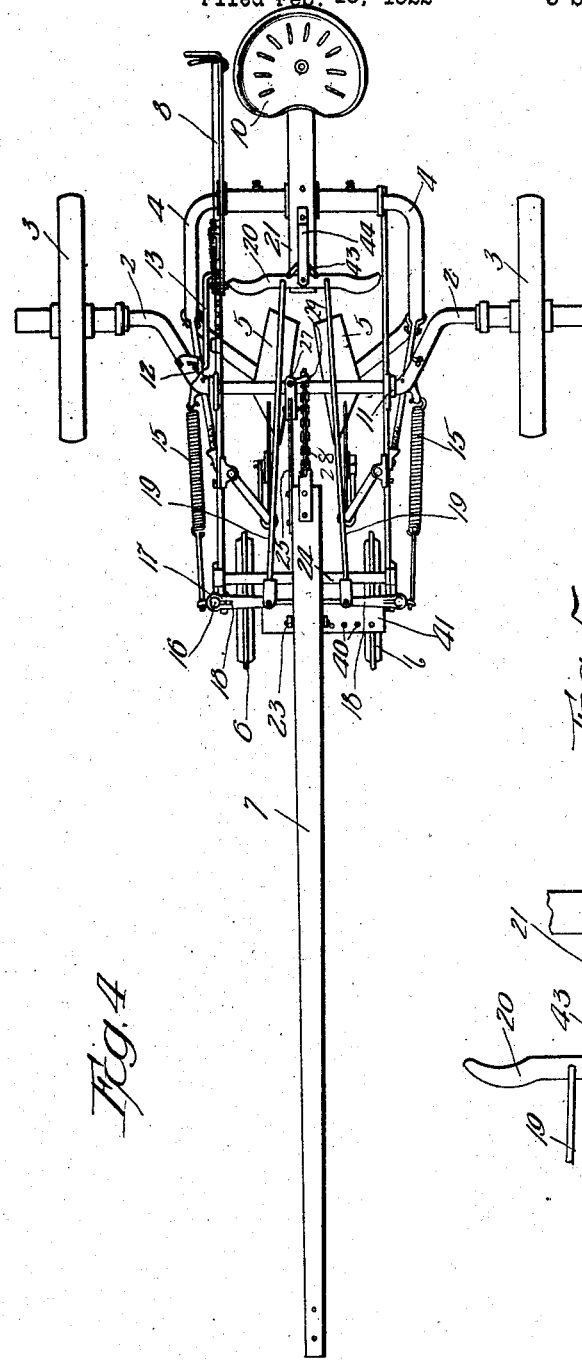
Figure 4 is a plan view of the machine.

The steering wheels 6 are carried by axles having vertical extensions 16 each journaled in bearings 17 on the frame. Fixed to the upper ends of the vertical extensions 16 are crank arms 18 connected by links 19 to a steering lever 20 pivoted to an extension 21 of the seat supporting bar. The steering lever 20 is located so that it may be easily manipulated by the feet of the operator. The manner in which this mechanism is operated will be clear by referring to Figure 4. The arrangement is such that when the operator desires to steer to the right he presses on the right end of the steering lever and vice versa.

Figure 5:
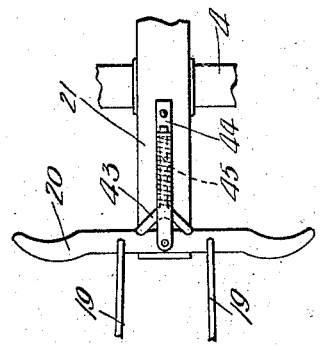
Figure 5 is a detail plan view of a portion of the steering mechanism.

Provision is made for automatically centering the steering lever 20 thereby making it easier for the operator to control the implement by insuring that the steering wheels will always be straight ahead unless positively guided to the right or left by the operator. For this purpose there is provided a Y-shaped member 43 (see Fig. 5) slidably mounted in a bracket 44 on member 21. The two arms of the Y bear in semi-circular slots in the lever 20. The Y-shaped member is normally biased into contact with the lever by means of a spring 45 between the neck of the Y and the rear end of bracket 44. Whenever the lever 20 is moved to the right or left, the left or right arm of the Y-shaped member will be pushed backwardly and slightly to one side, the mounting of the member being such as to permit this slight sidewise movement. During this movement the spring 45 will be compressed. The spring is made strong enough so that, when pressure is relieved from the steering lever 20, the lever will be automatically returned to its original position by the force of the spring which tends to normally maintain the parts in the position illustrated in Figure 5.

It is desirable to have the pole move freely when the machine is in its lowered operating position because, at that time, it is desirable to steer the machine by means of the steering wheel and not by the pole. On the other hand, it is desirable to have the pole rigid when the machine is in transport position, at which time the pole must serve as a guiding means. The mechanism for connecting the pole to the machine is arranged so that the pole is automatically connected rigidly with the machine when it is raised to transport position and is likewise automatically released when the machine is lowered to operating position.

The pole 7 is pivoted to a carrying member 22 by means of a bracket 23 which permits the pole to swivel in a horizontal plane and also in a vertical plane. In other words, the pole is connected to the member 22 by a universal joint. The carrying member 22 is pivoted at the point 24 to the frame and has attached to it a bar 25 connected by a pin and slot connection 26 to a crank 27 on the crank axle.

When the machine is in its working position as illustrated in Figure 1, the rear end of the carrying member 22 is lowered as illustrated, but, as the machine moves to its raised position illustrated in Figure 2, the rear end of this member is raised by reason of the fact that the crank 27 on crank axle 2 swings in the pin and slot connection with the member 25 and raises the carrying member as the crank axle turns clockwise in raising the machine.

A chain 28 connects the rear end of the pole 7 with an arm 29 on the crank 27. There is also located on the rear end of the pole a plate 30 having in it a notch 31 with which cooperates a roller 32 on a bracket 33 mounted on the carrying member 22.

This connection of the pole to the machine operates as follows:

When the machine is in lowered operating position, the chain 28 is loose as illustrated in Figure 1, the rear end of the pole 7 is free of the carrying member 22, and the pole is free to move up and down and sidewise to a limited extent, the latter movement being limited by the length of the chain 28, but being sufficient so that all ordinary movements of the pole will not affect the steering of the machine in any way, the machine being steered at that time by the steering wheels 6.

As the machine is raised, the crank 27 on the crank axle rotates rearwardly, that is, clockwise, thereby lifting the rear end of the carrying member 22 and also moving the chain 28 rearwardly so as to bring it to a taut position. The final position of the parts is illustrated in Figure 2 in which the chain is taut and the roller 32 on the carrying member 22 is engaged in the notch 31 on the bracket 30 on the tongue. In this position, the rear end of the tongue is rigid with the carrying member 22. It cannot be swung sidewise without steering the machine. While the tongue connection has been moved to this position, the steering wheels have been raised clear of the ground. Accordingly, when the machine is in its raised position, the steering wheels no longer serve as a steering means, but the tongue has been converted into a steering means for guiding the machine which, under these conditions, is a two-wheel carriage.

The sloping surfaces 34 and 35 of the bracket 30 and the fact that the chain 28 is tightened as the machine is raised, insure that the rear end of the tongue will be swung to a position such that the roller 32 seats in the notch 31.

When the machine is lowered, the reverse action takes place, that is, the chain 28 is loosened and the roller 32 moves out of the slot 31 leaving the rear end of the tongue free to swing relative to the frame.

It should be noted that the connection of the pole to the machine including the mechanism for automatically locking it in position can be moved sidewise to permit the pole to be in different positions as required for two or three horses. The bracket 23 can be connected in any one of a plurality of holes 40 in plate 41, the stub pole 22 can be slid along the pivot rod 24, and the crank 27 can be adjusted to a different position on the crank axle.

The operation of the machine as a whole is as follows:

When the machine is being used, it is in the position shown in Figure 1. In this position, the frame is lowered and the steering wheels 6 are in contact with the ground. The tongue 7 is free to move in both a horizontal and vertical plane and consequently does not act to steer the machine nor are movements of the machine transferred to the pole. The operator guides the machine by means of the foot lever 20 which steers the wheels 6. Should the operator desire to raise the machine slightly, he may do so by pulling backward on the lever 8 which will not affect the operation of the machine, but will vary the height of the frame relative to the ground thereby varying the depth of the beet pulling arms.

However, if this lifting movement be continued, or if it be desired to raise the machine to transport position, the operator pulls on the lever 8 until it reaches the position shown in Figure 2. This movement swings the crank axles in a clockwise direction and raises the frame so that the beet pulling arms as well as the steering wheels 6 and the coulters 61 are raised clear of the ground. This raising movement may be easily accomplished in view of the fact that the spring 15 serves to balance the machine so that very little force is required to move the lever 8. During this raising operation the pole 7 is brought back to its central position and locked rigidly to the frame of the machine so that it then acts as a guiding means. The steering wheels 6 are no longer operative for such purpose because they are out of contact with the ground. The general effect of the raising movement is to convert the beet puller, which was a four-wheeled implement, into a two-wheel cart steered by the steering pole. This enables the machine to be easily transported. The entire adjustment is secured through the manipulation of a single lever as distinguished from two or more levers which have been heretofore used.

It is to be understood that the structure shown is for purposes of illustration only and that variations may be made therein without departing from the spirit and scope of the invention as defined by the claims.

I claim:

1. A beet puller having beet pulling devices, means for lowering the beet puller to move the pulling devices to working position in the ground and for raising it to raise the pulling devices to transport position above the ground, a guiding pole connected to the beet puller to be movable laterally relative to it, and means acting automatically in response to movements of the beet puller by the raising and lowering means to lock the pole rigidly to the beet puller as it is raised by the raising means to lift the pulling devices out of the ground and to automatically free the pole to permit it to move laterally relative to the beet puller as the beet puller is lowered to cause the pulling devices to enter the ground to working position.

2. A beet puller having beet pulling devices, steering wheels, means for steering the wheels, a guiding pole connected to the beet puller so as to be movable laterally relative to it, means for lowering the beet puller to cause the pulling devices to enter the ground to working position and the steering wheels to contact the ground, said means also serving to raise the beet puller to move the pulling devices to transport position above the ground and the steering wheels out of contact with the ground, and means acting automatically in response to the raising movement of the puller by said raising means to lock the pole rigidly to the beet puller as it is raised by said raising means to lift the pulling devices out of the ground to transport position and to automatically release the guiding pole to permit it to move laterally relative to the beet puller as the latter is lowered to cause the pulling devices to enter the ground to working position and the steering wheels to contact the ground.

3. A beet puller having a frame, beet pulling devices, steering wheels, a pole connected to the frame so as to be movable laterally relative thereto, and means operable by a single lever to raise the frame to raise the beet pulling devices out of the ground to transport position, to lift the steering wheels out of contact with the ground, and to automatically lock the pole rigidly to the frame for steering purposes, said means also serving, when operated by said lever in a reverse manner, to lower the beet puller to move the beet pulling devices to working position in the ground and the steering devices to contact the ground and to automatically release the pole so that it is movable laterally relative to the beet puller.

4. A beet puller having a frame, beet pulling devices, steering means, a pole mounted so as to be movable laterally relative to the beet puller, and mechanism operable by a single lever for adjusting the height of the beet pulling devices, for raising and lowering the frame to render the steering means inoperative and operative, and to automatically lock the tongue rigidly with the frame when it is raised and to release it so that it is movable laterally relative to the frame when the frame is lowered.

5. A beet puller having a crank axle carrying supporting wheels, steering means, a guiding pole mounted so as to be movable laterally relative to the beet puller, a single lever for swinging the crank axle to raise and lower the beet pulling devices and the steering means, and mechanism associated with the crank axle and guiding pole for automatically locking the pole rigidly to the beet puller as it is raised to transport position and for automatically releasing it to permit it to move laterally relative to the beet puller as the beet puller is lowered to working position.

6. A beet puller having a frame, a crank axle carrying supporting wheels, beet pulling devices, steering wheels carried by the frame, means for guiding the steering wheels, a tongue mounted on the frame so as to be movable laterally relative thereto, a single lever for swinging the crank axle to lower the beet pulling devices and steering means into and out of contact with the ground, and mechanism associated with the crank axle and the pole for automatically locking the pole rigidly to the frame when the frame is raised to transport position and for automatically releasing it when the frame is lowered to operating position.

7. An agricultural implement having steering means, ground working tools, a pole mounted to swing laterally relative to the implement, a single means for raising and lowering the implement to lift the tools clear of the ground and to lower them into the ground to working position, and mechanism responsive to the raising and lowering of the tools for automatically rendering the pole operative as a guiding means and the steering means inoperative when the implement is raised and for automatically rendering the steering means operative for steering purposes and the pole inoperative as a guiding means when the tools are lowered into the ground to operating position.

8. An agricultural implement having a steering means, ground working tools, a pole movable laterally relative to the implement, and means operable by a single lever which, when moved in one direction will raise the tools clear of the ground, render the steering means inoperative for steering purposes and render the guiding pole operative as a guiding means, and which, when the lever is moved in the opposite direction, will lower the tools into the ground to working position, render the steering means operative for steering purposes and render the guiding pole inoperative as a guiding means.

9. An agricultural implement having a crank axle carrying ground wheels for supporting the implement, a pole mounted to swing relative to said implement, means for swinging the crank axle to raise and lower the implement, and means operated by movements of the crank axle for locking the pole rigidly to the machine when the crank axle is moved to raise the implement and for releasing the pole to permit it to move relative to the implement when the crank axle is moved to lower the implement.

10. An agricultural implement having a crank axle carrying ground wheels for supporting the implement, means for swinging the crank axle to raise and lower the implement, steering mechanism operative to steer the implement when the latter is in lowered or operating position but inoperative to steer the machine when it is in raised or transport position, a pole mounted to swing relative to the implement, and means operated by movements of the crank axle for locking the pole rigidly to the implement when the crank axle is moved to raise the implement and for releasing the pole to permit it to move relative to the machine when the crank axle is moved to lower the implement.

11. A beet puller having a steering means, a guiding pole movable relative to the beet puller, means for raising the beet puller to transport position and lowering it to working position, means for automatically rendering the steering means inoperative for steering purposes and the guiding pole operative when the beet puller is raised to transport position and for rendering the steering means operative and the guiding pole inoperative when the beet puller is lowered to working position, and means for automatically centering the steering means when the beet puller is raised to cause it to normally occupy a straight-ahead position.

12. A beet puller having beet pulling devices, a crank axle carrying ground wheels, steering wheels carried by the beet puller so as to be in contact with the ground when the beet puller is in lowered or operating position but to be out of contact with the ground when the puller is in raised or transport position, controlling mechanism for the steering means serving to automatically center the steering means when it is not positively moved for steering purposes, a guiding pole, a single lever for swinging the crank axle to adjust the height of the pulling devices and to raise and lower the machine to and from working position, and connections between the crank axle and the guiding pole for locking the pole rigidly to the machine when it is raised to transport position and for releasing it so that it is inoperative as a guiding means when the puller is lowered to operating position.

13. A beet puller having beet pulling devices, a wheeled support, steering wheels for guiding the beet puller when it is in working position, and means operable by a single lever for raising the beet puller to raise both the beet pulling devices and the steering wheels clear of the ground for transport purposes and to lower the pulling devices to working position and position the steering wheels in contact with the ground.

14. A beet puller having beet pulling devices, a wheeled support, steering wheels for guiding the beet puller when it is in working position, mechanism for operating the steering wheels, and means operable by a single lever for adjusting the height of the beet pulling devices to regulate the depth of working, and for raising the beet pulling devices and steering wheels clear of the ground for transport purposes.

In testimony whereof, I affix my signature.

HUGO T. LINDGREN.